United States Patent
Yatsugi et al.

(10) Patent No.: US 8,009,536 B2
(45) Date of Patent: Aug. 30, 2011

(54) RECORDING AND REPRODUCING APPARATUS

(75) Inventors: Tomishige Yatsugi, Yokohama (JP); Keiji Nagayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 387 days.

(21) Appl. No.: 11/960,866

(22) Filed: Dec. 20, 2007

(65) Prior Publication Data

US 2008/0151717 A1    Jun. 26, 2008

(30) Foreign Application Priority Data

Dec. 25, 2006  (JP) ................................. 2006-346926

(51) Int. Cl.
G11B 7/004 (2006.01)
(52) U.S. Cl. .................................. 369/53.12; 369/53.42
(58) Field of Classification Search ............... 369/53.12, 369/53.13, 53.17, 53.18, 53.42, 53.15; 348/222.1
See application file for complete search history.

(56) References Cited

U.S. PATENT DOCUMENTS

| | | | | | |
|---|---|---|---|---|---|
| 5,563,861 | A | * | 10/1996 | Kudo et al. ................ | 369/53.12 |
| 5,917,724 | A | * | 6/1999 | Brousseau et al. ............ | 700/81 |
| 2002/0021635 | A1 | * | 2/2002 | Park et al. .................. | 369/47.12 |
| 2005/0232103 | A1 | * | 10/2005 | Yoshida ..................... | 369/47.14 |
| 2005/0254381 | A1 | * | 11/2005 | Desormeaux, Jr. ........ | 369/53.15 |
| 2007/0025215 | A1 | * | 2/2007 | Kinoshita et al. .......... | 369/53.15 |
| 2007/0036049 | A1 | * | 2/2007 | Im et al. .................... | 369/47.16 |

FOREIGN PATENT DOCUMENTS

| | | |
|---|---|---|
| JP | 3-080596 | 8/1991 |
| JP | 7-67000 | 3/1995 |
| JP | 9-200413 | 7/1997 |
| JP | 2001-265538 | 9/2001 |
| JP | 2003-346434 | 12/2003 |
| JP | 2004-103053 | 4/2004 |
| JP | 2005-032377 | 2/2005 |
| JP | 2006-048789 | 2/2006 |
| JP | 2006-252733 | 9/2006 |

* cited by examiner

*Primary Examiner* — Wayne R Young
*Assistant Examiner* — Thomas D Alunkal
(74) *Attorney, Agent, or Firm* — Antonelli, Terry, Stout & Kraus, LLP.

(57) ABSTRACT

A recording and reproducing apparatus includes an access display unit of a hard disk and a failure diagnosis unit to carry out a failure diagnosis by using error information of data reproduced from the hard disk, in which either a video recorded in the hard disk is displayed on the access display unit or an access on the reproduction is displayed thereon, and a warning content obtained from a diagnostic result of the hard disk is displayed after the access is completed.

8 Claims, 10 Drawing Sheets

ERROR IS DETECTED FOR THE DATA OUTPUT FROM THE HARD DISK.

PLEASE BE ADVISED TO INSPECT BY SERVICE.

ERROR IS DETECTED FOR THE DATA OUTPUT FROM THE HARD DISK.

BACKUP FOR THE DATA IS IMMEDIATELY NECESSARY.

FIG. 9

| SCENE No. | DIAGNOSTIC RESULT |
|---|---|
| 001 | ○ |
| 002 | △ |
| 003 | × |
| ... | ... |

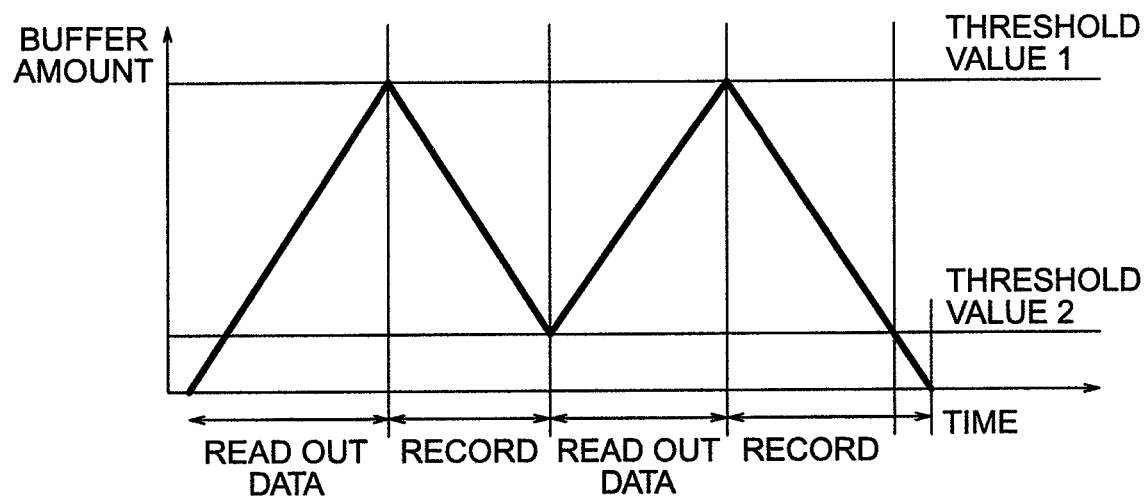

RECORDING AND REPRODUCING APPARATUS

INCORPORATION BY REFERENCE

The present application claims priority from Japanese application JP2006-346926 filed on Dec. 25, 2006, the content of which is hereby incorporated by reference into this application.

BACKGROUND OF THE INVENTION

The present invention relates to a recording and reproducing apparatus, for example, to a technique for displaying a failure diagnostic result of a hard disk-mounted recording and reproducing apparatus with a camera, recorder, hard disk, etc.

As background art of this technical field, JP-A-2001-265538 has been proposed, for example. This document discloses, as a problem, "To provide a failure predicting device to predict a failure of a disk device by relating each inspection result of plural inspection items." The document also discloses, as a solution, indicating that "The failure predicting device to predict the failure of the disk device provided at least with a disk to record data and a head to record data on the disk and read out the data from the disk, in which the failure predicting device provides with inspecting means to inspect plural inspection items (small items) to predict the failure of the disk device, and failure predicting means to predict the failure of the disk device based on a result by combining the inspection results obtained from the inspecting means for each of the inspection items and a prescribed failure prediction standard." Further, claim 7 in this document indicates that "the disk device is characterized in that the inspecting means does not inspect to predict the failure while data is being recorded or reproduced on or from the disk."

Furthermore, JP-A-9-200413 has been proposed as a technique for predicting a failure on the basis of error information of reproduction. This document discloses, as a problem, "To provide a digital copying machine to be able to reduce as a down-time as possible of the machine so that a failure is predicted before a high-capacity memory such as HDD (Hard Disk Drive) is failed and an appropriate maintenance is applied to the machine before it is completely useless." The document further discloses, as a solution, indicating that "a block number from which a read error is found out is stored in a nonvolatile memory used for storing defective positions. In this case, a total sum of numbers of the blocks for the detective positions is calculated and the result is also stored in "check". At this time, it is checked whether the number of defective blocks exceeds a predetermined value N-BAD (a threshold value of a predetermined number of blocks for the defective positions. If it exceeds, a message urged to exchange HDD is displayed on an operation unit. If a device with the operation unit is connected with a service center by a telephone line, a notice for a time to exchange the HDD is also noticed to the service center simultaneously."

SUMMARY OF THE INVENTION

In a recording and reproducing apparatus, a hard disk is used as means for storing contents, and its demand has been increased. However, a read error of the hard disk has been increased by causing use for a long time and adhesion such as dust, so that the contents cannot be read in some cases. For this reason, it is desirable to carry out a failure predicting diagnosis (hereinafter, failure diagnosis) in advance and notify its predicted result to a user. For example, when a failure of the hard disk is predicted by increasing the read error, it is desirable to urge and warn the user to take a backup so that the contents recorded on the hard disk are not made impossible to read data due to the error increase.

However, in the case of the related recording and reproducing apparatus for use in the failure predicting device of JP-A-2001-265538, a diagnostic result cannot be displayed until a failure diagnosis is completed since the failure diagnosis is carried out after the reproducing operation is stopped. Therefore, there arises a problem that a waiting time becomes long to obtain the failure diagnostic result for a user since the display of failure diagnostic result delays.

In contrast to the problem, JP-A-9-200413 as related art discloses to carry out a failure diagnosis on a reproducing operation. Therefore, the foregoing problem is solved by displaying a failure diagnostic result immediately after a reproducing operation is stopped because of carrying out the failure diagnosis on the reproducing operation. However, in the case of JP-A-200413 as related art, two display devices are used: an access display device for displaying an operating state of the hard disk; and an alarm display device for displaying a diagnostic result of that. For this reason, there arises a problem to increase the cost due to increasing the number of components and growing the device in size.

Consequently, it is desirable to realize a recording and reproducing apparatus, without cost increase due to increasing the number of components and growing the device in size. For example, the recording and reproducing apparatus therefore may be provided with a hard disk to record and reproduce video and audio data and an access display unit to display an operating state of the hard disk. The recording and reproducing apparatus may further be provided with a failure (fault) diagnosis unit to carry out a failure diagnosis of the hard disk, so that "access in progress" is displayed on the access display unit when in a reproduction operating mode, and a diagnostic result is displayed on the access display unit after completing the reproduction operating mode.

An object of the invention is to provide a downsized recording and reproducing apparatus.

In order to achieve the aforementioned object, according to an aspect of the invention, in a recording and reproducing apparatus provided with a hard disk to record and reproduce data and an operating state display unit to display an operating state of the hard disk, and the apparatus is further provided with a failure diagnosis unit to carry out a failure diagnosis by using error information of the data reproduced from the hard disk, so that a diagnostic result obtained from the failure diagnosis unit is displayed on the operating state display unit after completing a predetermined operating mode of the apparatus.

A detail of the invention is as described in scope of claims.

According to the invention, in a recording and reproducing apparatus provided with a hard disk to record and reproduce video and audio data and an access display unit to display an operating state of the hard disk, the recording and reproducing apparatus is further provided with a failure diagnosis unit to carry out a failure diagnosis of the hard disk, so that "access to the hard disk in progress" is displayed on the access display unit when in a reproduction operating mode and a diagnostic result is displayed on the access display unit after completing the reproduction operating mode, thereby restraining cost increase due to increasing the number of components and growing the apparatus in size.

Other objects, features and advantages of the invention will become apparent from the following description of the embodiments of the invention taken in conjunction with the accompanying drawings.

BRIEF DESCRIPTION OF THE DRAWINGS

FIG. 9 is a correspondence table showing contents numbers and diagnostic results of the camera in the third embodiment;

FIG. 12 is a timing chart showing a buffer amount in the record operating mode of the camera; and FIG. 13 is a display example of contents protection of the camera.

DESCRIPTION OF THE EMBODIMENTS

Figure 1:
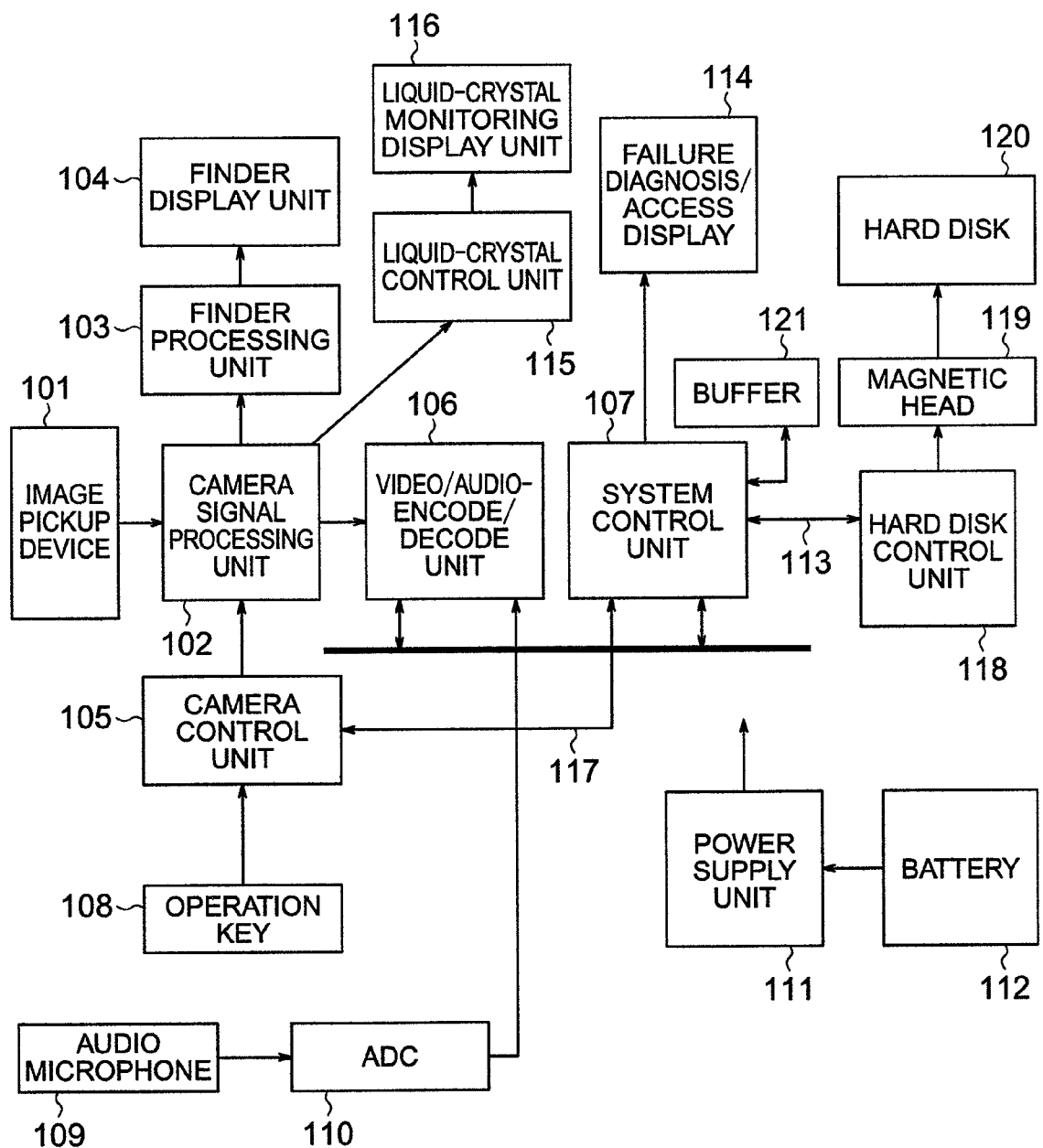
FIG. 1 is a circuit block diagram showing a hard disk-mounted camera in the invention.

First, a general description below will be concerned with an embodiment of the invention.

In the embodiment of invention, in a recording and reproducing apparatus provided with a hard disk to record and reproduce data and an operating state display unit to display an operating state of the hard disk, the recording and reproducing apparatus features that the apparatus is further provided with a failure diagnosis unit to carry out a failure diagnosis by using error information of the data reproduced from the hard disk and a diagnostic result obtained from the failure diagnosis unit is displayed on the operating state display unit after completing a predetermined operating mode of the apparatus. This technique described above can restrain cost increase due to increasing the number of components and growing the apparatus in size. Further, a video is improved from being hard to see caused on overlapping character information with a reproduced image since the diagnostic result is not displayed on the video to be displayed as a reproduced image, but is displayed on the operating state display unit. Furthermore, the diagnostic result is not displayed in superposition on the video, but "access in progress" is displayed on an access display unit which is a display of operating state, when the hard disk is in the state of recording or reproduction, and the diagnostic result of the failure diagnosis is displayed after the record or reproduction is completed. Therefore, it can be restrained that the user becomes too sensitive to a possible occurrence of a failure of the hard disk since.

The predetermined operating mode is a record operating mode or reproduction operating mode of the apparatus. In one feature of the invention, the failure diagnosis performed by the failure diagnosis unit is carried out during the predetermined operating mode of the apparatus. With this technique, a time period from when the record and reproduction are completed to when a diagnostic result is displayed can be shortened since the failure diagnosis is carried out during the record or reproduction.

In another feature of the invention, in response to the diagnostic result obtained by the failure diagnosis unit, a duration of turning the operating state display unit on and/or off is changed. With this technique, a degree of risk by which the hard disk is broken down can be notified to a user in response to the duration of turning the operating state display unit on.

In still another feature of the invention, the diagnostic result obtained from the failure diagnosis unit is progressively deteriorated, the operating state display unit is made a turning-on duration long and a turning-off duration short. With this technique, it is easier to recognize the degree of risk by the user since the turning-on duration becomes long when the degree of risk rises for a failure of the hard disk.

In still another feature of the invention, the operating state display unit is an access display unit to display a state of indicating that the hard disk is now on an access state. With this technique, the diagnostic result of failure diagnosis can be displayed by using the access display unit used for displaying a state of accessing to the hard disk or an optical disk incorporated in a video camera in progress.

In a second embodiment of invention, in a recording and reproducing apparatus provided with a hard disk to record and reproduce data, a video screen generation unit to generate screen information for displaying a list image of contents recorded on the hard disk, and a failure diagnosis unit to carry out a failure diagnosis by using error information of the data reproduced from the hard disk, the apparatus is characterized in that a diagnostic result obtained from the failure diagnosis unit is displayed for each of the contents in the list image generated by the screen generation unit. With this technique, a user is urged to take a backup for contents having a high degree of risk since the degree of failure risk for each of the contents can be displayed on the content list displaying video screen.

As is apparent from the aforementioned general description of the embodiments in the invention, in the recording and reproducing apparatus provided with the hard disk to record and reproduce video and audio data, and the access display unit to display an operating state of the hard disk, the apparatus further provides with the failure diagnosis unit to carry out a failure diagnosis of the hard disk and in the reproduction operating mode, "access in progress" is displayed on the access display unit and after the reproduction operating mode is completed, the diagnostic result is displayed on the access display unit, thereby restraining cost increase due to increasing the number of components and growing the device in size.

Hereinafter, an example of a recording and reproducing apparatus mounted with a hard disk (sometimes simply referred to as camera) in the invention will be described with reference to FIGS. 1, 11A and 11B in detail. These drawings show an example of using a hard disk-mounted camera with the recording and reproducing apparatus of the invention.

Embodiment 1

A constitution and operation of the hard disk-mounted camera with the recording and reproducing apparatus in the invention will be described with use of FIG. 1. FIG. 1 shows a circuit block diagram of the hard disk-mounted camera.

An image pickup device 101 is constituted by CCD (Charge Coupled Device) or CMOS (Complementary Metal Oxide Semiconductor) to convert an incident light to a photoelectric. A CPU (Central Processing Unit) built in a camera control unit 105 controls a camera signal processing unit 102 to continuously carry out a photoelectric conversion from the image pickup device 101 in response to a sensor drive pulse generated in the camera signal processing unit 102. The photoelectric is then converted to a video signal constituted by a base band signal form of an RGB signal in the camera signal processing unit 102. The video signal is sent to a video/audio-encode/decode unit 106, and processed to be matched with a form of electronic view finder by a finder processing unit 103 to determine an image-taken angle of the camera. Finally, the video signal is displayed as a video by a finder display unit 104. At the same time, the video is also displayed on a liquid-crystal monitoring display unit 116 through a liquid-crystal monitoring control unit 115.

In a record operating mode, the video signal constituted by the base band signal form of the RGB signal is encoded into MPEG2 (Moving Picture Expert Group 2) system in the video/audio-encode/decode unit 106. Further, an audio signal sent to an audio microphone 109 is converted from an analog to digital signal by an audio ADC (Analog Digital Converter) 110. Thereafter, the audio signal is encoded into MPEG2 system as well as the video signal by the video/audio-encode/decode unit 106. In addition, the system for encoding the signal by the video/audio-encode/decode unit 106 is not limited to MPEG 2 system, but H.264 system and MPEG4 system may also be acceptable, for example.

The video and audio data encoded by the video/audio-encode/decode unit 106 is matched with a timing of the video and audio, and made into recording data with a header having necessary data, by a recorded signal control software stored in CPU of a system control unit 107. Thereafter, the recording data is sent to a hard disk drive constituted by a hard disk control unit 118, a magnetic head 119 and a hard disk medium 120 through a communication bus line 113 by a hard disk control software stored in the CPU of the system control unit 107. The hard disk drive carries out a writing of the received recording data in the hard disk medium 120.

In a reproduction operating mode, reproducing data containing the video and audio data desired by a user is read out from the hard disk medium 120 as magnetic media through the magnetic head 119, by controlling the hard disk control unit 118. The read-out reproduced data is sent to the system control unit 107 through the communication bus line 113. The system control unit 107 decodes the header portion of reproduced data to send a part of the video and audio data to the video/audio-encode/decode unit 106. The video and audio data is decoded by the video/audio-encode/decode unit 106 to display a video on the finder display unit 104 through the camera signal processing unit 102 and finder control unit 103, and also display the video on the liquid-crystal monitoring display unit 116 through the liquid-crystal monitoring control unit 115. Here, the video and audio data may be output to an external device from an external output terminal of the hard disk-mounted camera, although such constitution is not shown in FIG. 1.

For the camera operated by the user, a signal generated by operating an operation key 108 is fetched into the CPU of camera control unit 105 to supply the signal to the system control unit 107 through a communication line 117. Further, a DC power supplied from a battery 112 is converted to respective voltages by a power source unit 111 in the camera to supply necessary voltages to respective blocks.

Next, a description will be concerned with operations of carrying out a failure diagnosis in the reproduction or record operating mode of the hard disk-mounted camera, and displaying a diagnostic result after the reproducing operation is completed.

When the reproduction operating mode is set by operating the operation key 108, the system control unit 107 makes the failure diagnosis/access display unit 114 to turn on and off by a predetermined time interval, as a display indicating the reproduction operating mode in progress (or access to the hard disk in progress). The reproducing data containing the video and audio data, desired by the user, recoded on the hard disk medium 120 is read out by controlling the hard disk control unit 118, as described above. Regarding the read-out reproduced data, the video and audio data is then started to be accumulated in a buffer memory 121 through the system control unit 107. The reproduced data accumulated in the buffer memory 121 is extracted by a predetermined rate to be encoded in the video/audio-encode/decode unit 106, and thereby display a reproduced video on the liquid-crystal monitoring display unit 116 or the like. At the same time, the accumulation of the video and audio data read out from the hard disk medium 120 continues in the buffer memory 121, but stops to be read out from the hard disk medium 120 if a buffer capacity of the buffer memory 121 becomes a data amount equal to or greater than a predetermined value 1. Thereafter, the extraction of the accumulated data continues from the buffer memory 121, but starts to be read out from the hard disk medium 120 if the data amount of the buffer memory 121 is equal to or less than a predetermined amount 2. In the reproduction operating mode, the start of reproducing operation and stop of this operation are repeated intermittently. On this reproducing operation, the system control unit 107 obtains the number of Raw Read Errors (hereinafter, the number of errors) of the reproduced data to cumulatively count the number of the errors. When an input of reproduction stop is set by operating the operation key 108 thereafter, the system control unit 107 then obtains a pre-correction error rate from a value of the cumulative number of Raw Read Errors, obtains a difference from comparing an initial pre-correction error rate obtained at an initial state with the foregoing pre-correction error rate, and carries out the failure diagnosis by further comparing the obtained difference with a previously set threshold value. When a diagnostic result is obtained from the failure diagnosis, the system control unit 107 controls the hard disk control unit 118 to stop the reproducing operation from the hard disk medium 120, and also controls so that a display of failure diagnosis/access display unit 114 becomes a display matched with the diagnostic result of the failure diagnosis from turning on and off at the predetermined time intervals indicating the reproduction operating mode in progress.

Here, the diagnostic result is "good" when the difference is small, and the display of failure diagnosis/access display unit 114 is turned off. That is, the display of failure diagnosis/access display unit 114 is turned on and off in the reproduction operating mode, and turned off after the reproduction operating mode is stopped. In this way, it is not necessary to display the display unit 114 when the diagnostic result is "good" because it is unnecessary to be notified to the user.

The diagnostic result becomes "intermediate" when the difference is intermediate, and the display of failure diagnosis/access display unit 114 is turned on and off at the predetermined time intervals. That is, the display of failure diagnosis/access display unit 114 is turned on and off in the reproduction operating mode, and also turned on and off after the reproduction operating mode is stopped. In this way, when the number of errors is intermediate, caution is necessary by judgment since a failure will occur shortly. The caution makes the user to recognize that a failure of the hard disk comes close since the failure diagnosis/access display unit 114 turns on and off continuously even after the reproduction operating mode is stopped. In this case, it can be restrained that the user feels too sensitive to a possible occurrence of a failure of the hard disk since the diagnostic result is not sent to the liquid-crystal monitoring display unit 116, the display of which is monitored by the user seeing a reproduced video, and the diagnostic result of failure diagnosis is displayed after the reproduction is completed. In addition, the time intervals of turning on and off in the reproduction operating mode and of turning on and off the display of failure diagnostic result may be the same or may be different.

The diagnostic result becomes "warning" when the difference is large, and the display of failure diagnosis/access display unit 114 is turned on and off. That is, the display of failure diagnosis/access display unit 114 is turned on and off in the reproduction operating mode, and turned on after the reproduction operating mode is stopped. In this way, when the number of errors becomes increased, the warning is necessary by judgment because of involving a risk of failure. After the reproduction operating mode is stopped, the risk of failure for the hard disk is made the user to aware of a failure since the failure diagnosis/access display unit 114 turns on and off continuously, so that the user can be urged to take a backup of the recorded data.

An operation on the record operating mode will be described with use of FIG. 1 and FIG. 12. FIG. 12 is a timing chart showing a buffer capacity of the hard disk-mounted camera in the record operating mode in the invention.

The record operating mode is set by operating the operation key 108. The system control unit 107 makes the failure diagnosis/access display unit 114 to turn on and off by a predetermined time interval, as a display indicating an on-state of the record operating mode (access in progress), and also makes the video signal from the image pickup device 101 to accumulate temporarily, as recoding data, in the buffer memory 121 through the camera signal processing unit 102 and video/audio-encode/decode unit 106. When the buffer capacity of the recording data accumulated in the buffer memory 121 becomes a data amount equal to or greater than an upper limit value (threshold value 1), the data accumulated in the buffer memory 121 is extracted and recorded on the hard disk medium 120. When the data amount in the buffer memory 121 becomes a data amount equal to or less than a lower limit value (threshold value 2), the record on the hard disk medium 120 stops, at the same time, the system control unit 107 controls the hard disk control unit 118 to read out reproducing data from the hard disk medium 120, obtain the number of Raw Read Errors (hereinafter, the number of errors) of the reproduced data and count a cumulative number of the errors. In the record operating mode, the recording and reproducing operations are repeated intermittently. Thereafter, when an input of recording stop is set by operating the operation key 108, the recording data remained in the buffer memory 121 is recorded on the hard disk medium 120. The system control unit 107 obtains a pre-correction error rate from the value of the cumulative number of Raw Read Errors, and obtains a difference from comparing an initial pre-correction error rate obtained at the initial state with the foregoing pre-correction error rate, and carries out the failure diagnosis by further comparing the obtained difference with a previously set threshold value. When a diagnostic result is obtained from the failure diagnosis, likewise on the reproduction operating mode, the system control unit 107 controls the hard disk control unit 118 to make the reproducing operation stopped, and also controls so that the display of failure diagnosis/access display unit 114 becomes a display matched with the diagnostic result of failure diagnosis.

As described above, the diagnostic result of failure diagnosis is displayed on the failure diagnosis/access display unit 114 which also displays the operating state of the hard disk, thereby restraining cost increase due to increasing the number of components and growing the device in size. Further, the diagnostic result is not displayed on a video of the reproduced video, but displayed on the failure diagnosis/access display unit 114 of the hard disk, so that the video is improved from being hard to see otherwise caused by overlapping character information with a reproduced image. Further, the diagnostic result is not displayed on the video in superposition, but the failure diagnosis/access display unit 114 for displaying the operating state of the hard disk when the hard disk is in recording or being reproduced, displays "access in progress" and displays the diagnostic result of failure diagnosis after the recording or reproduction is completed. Therefore, it can be restrained that the user feels too sensitive to a possible occurrence of a failure of the hard disk. Further, the failure diagnosis is carried out during read-out operation for reading out the reproducing data in the reproduction operating mode and during a period in which the recording on the hard disk is stopped in the recording operating mode, so that a time period from when the recording or reproducing operation is completed to when the diagnostic result is displayed can be shortened. Further, with the diagnosis result deteriorated, a turning-on duration of the failure diagnostic/access display unit 114 is made longer and a turning-off duration thereof is made shorter, so that it is easier to recognize the degree of risk by the user since the turning-on duration becomes longer when the degree of risk rises for a failure of the hard disk.

In addition to this embodiment, a video overlapped with a message for caution or warning is displayed on the finder display unit 104, liquid-crystal monitoring display 116, and a display device connected to a camera external output video terminal which is not shown in the drawing.

In this embodiment, the failure diagnosis/access display unit 114 is constituted by LED (Light Emitting Diode) in consideration of the cost.

Here, the failure diagnosis/access display unit 114 may be made so that the LED is repeatedly turned on and off once a few seconds or ten-odd seconds in the record operating mode of the camera, for a purpose of reducing the power consumption of hard disk drive. In this case, a video signal generated from the camera signal processing unit 102 is not intermittent, but recorded intermittently by providing the buffer memory 121 around the system control unit 107. For this reason, with this operation matched, the failure diagnosis/access display unit 114 turns on and off intermittently. Likewise, even in the case where the camera is set to the reproduction operating mode, similarly, the reproducing operation of the data from the hard disk medium 120 is carried out intermittently by the buffer memory 121 around the system control unit 107. Therefore, with this operation matched, the failure diagnosis/access display unit 114 may be operated by turning on and off.

Figure 2:
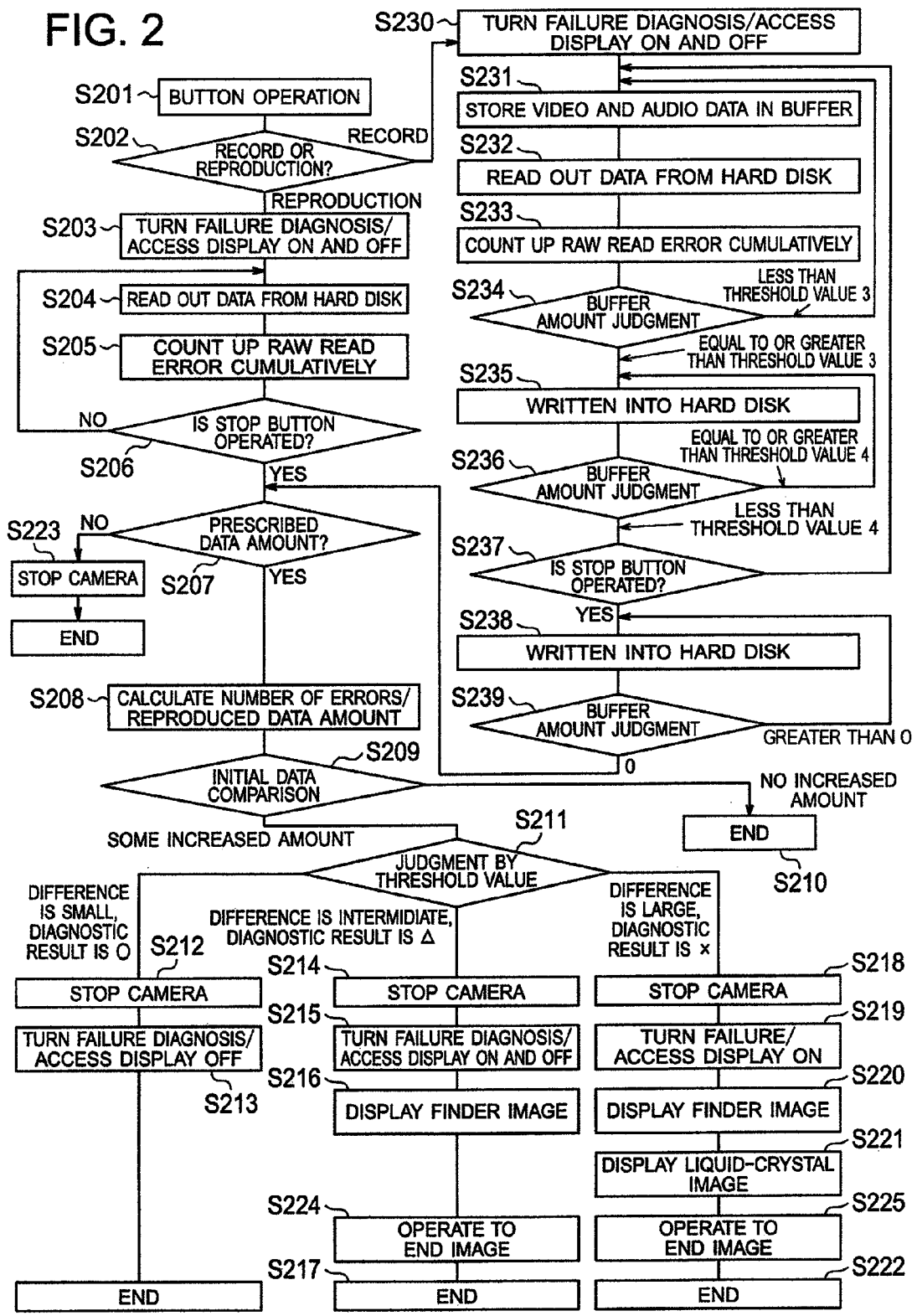
FIG. 2 is a flow chart showing an operation of displaying a diagnostic result of the camera.

Next, a processing flow of the invention from a start of a picture recording/reproduction to a display of the diagnostic result of the hard disk mounted on the camera in the invention will be described with use of FIG. 2. FIG. 2 is a flow chart showing a process to obtain a diagnostic result of the camera in the invention.

First, in step S201, a user operates a button to start a record or reproduction. In step S202, the process judges whether the record or reproduction is selected from the hard disk-mounted camera. If the reproduction is selected by the user, the operating mode is set to the reproduction operating mode. The failure diagnosis/access display unit 114 then starts to turn on and off at a predetermined time interval in step S203.

Reproducing data is read out from the hard disk medium 120 in step S204, and the number of Raw Read Errors is counted up cumulatively. In the case described above, the start and stop of the reproduction are repeated intermittently in the reproduction operating mode.

Here, the number of Raw Read Errors which is counted up is few, but normally indicates an error rate equal to or less than $10^{-8}$ to $10^{-9}$ when the camera is normal. For a purpose of judging a failure diagnosis, it is necessary to read out the reproduced data equal to or greater than $10^9$ bits (1 G bits). For this reason, approximately 3 minutes is necessary for the reproduction operating mode of video and audio data which is read out by 6 Mbps in the process of step S205. In step S206, when a stop button is not depressed, the process returns to the step S204 to read out data and repeat the process of step S205. When the stop button is depressed, the process in step S207 judges whether the reproduced data amount reaches to a prescript amount (approximately $10^9$ bits). In addition, the read-out operation in the step S207 stops to read the reproduced data from the hard disk medium 120.

When the user selects a record in the step S202, the operating mode becomes the record operating mode, and the failure diagnosis/access display unit 114 starts to turn on and off by the predetermined time interval in step S230. The recording data is accumulated temporarily in the buffer memory 121 connected with the system control unit 107, in step S231. The reproducing data (here, initial data) is read out from the hard disk in step S232, and the number of Raw Read Errors is counted up in step S233. A buffer capacity is judged for the recorded data accumulated in the buffer memory 121 in step S234. If the buffer capacity is less than the threshold value 1 (upper limit value) which is previously set as shown in FIG. 12, the process returns to the step S231 again to accumulate the recorded data and count up the number of Raw Read Errors. If the buffer capacity is equal to or greater than the threshold value 1, the accumulated recording data is extracted from the buffer memory 121 and written into the hard disk medium 120 in step S235. The buffer capacity is also judged in step S236. If the buffer capacity is equal to or greater than the threshold value 2 (lower limit value) which is previously set as shown in FIG. 12, the process returns to the step S235 to continuously write the recording data into the hard disk medium 120. If the buffer capacity is less than the threshold value 2, the process in step S237 judges whether the stop button is depressed. If the stop button is not depressed, the process returns to the step S231 to accumulate the recording data and count up the number of Raw Read Errors.

When the stop button is depressed in the step S237, all of the remained recording data is extracted from the buffer memory 121 and written into the hard disk medium 121 in step S238. The buffer capacity is then judged in step S239. When the buffer capacity becomes 0, the process judges whether the reproduced data amount reaches to a prescript amount (approximately $10^9$ bits in this application) in the step S207. In addition, the write operation of the recording data is stopped to write into the hard disk medium 120 in the step S207.

If the reproduced data amount is not reached to the prescript amount (approximately $10^9$ bits) in the step S207, the reproduction or recode operating mode of the camera is stopped in step S223, and the display of turning on and off the failure diagnosis/access display unit 114 is also stopped.

If the reproduced data amount reaches to the foregoing prescript amount or value in the step S207, a pre-correction error rate is calculated by the following expression executed in the CPU of system control unit 107 in step S208. A calculated result is saved in a memory (not shown in the drawing) around the system control unit 107.

pre-correction error rate=number of errors [bits]/data amount [bit] of entire reproduction Next, an "initial pre-correction error rate" is compared with a "pre-correction error rate at record/reproduction completed" in step S209, in which the "initial pre-correction error rate" is previously obtained and saved at a time of shipping the hard disk-mounted camera, and the "pre-correction error rate at record/reproduction completed" is a pre-correction error rate calculated by the step S208 in the record or reproduction operating mode. In the comparison process of the step S209, the process judges whether an extreme increase is present from the "initial pre-correction error rate." If the "initial pre-correction error rate" increases to the extent of 10% or the extreme increase is not present, the reproduction or record operating mode is stopped similarly to the step S223 in step S210, and the display of turning on and off the failure diagnosis/access display unit 114 is also stopped. In this embodiment, in the case of changing the pre-correction error rate, it assumes that the change of 10% does not correspond to the extreme increase since the error rate is easily changed to the extent of one digit. In the case where small changes are all detected, it is decided that the process does not execute for the small changes in order to prevent the processing performance of CPU from affection.

In the comparison step S209, if the "initial pre-correction error rate" increases to the extent of 100% (more than twice) and is an extreme increase, a judgment of a threshold value is executed in step S211. If the pre-correction error rate is changed normally as described above, the error rate is easily changed to the extent of 1 digit. However, a change of 100% is assumed as an extreme increase to detect a failure coming close, which is surely detected.

In the step S211, the threshold value has 2 stages defined by a threshold value 3<a threshold value 4. A difference between the "pre-correction error rate" and the "pre-correction error rate at record/reproduction completed" is obtained. If an expression of "pre-correction error rate at record/reproduction completed"<threshold value 3" is met, the difference is small as judged that "the diagnostic result is good or (○)." The reproduction or recode operating mode of the camera is stopped in step S212, and the failure diagnosis/access display unit 114 turns off in step S213. In this way, if the diagnostic result is "good", no notification is made to the user since it is not necessary to notify the result to the user.

In the step S211, if an expression of the threshold value 3<"pre-correction error rate at record/reproduction completed"<threshold value 4 is met, the difference is intermediate as judged that "the diagnostic result is middle or (Δ)." In step S214, if the reproduction or record operating mode of the camera is stopped by the user, the failure diagnosis/access display unit 114 is made turned on and off by the predetermined time interval in step S215. In step S216, a message calling for caution is displayed on the screen of finder display unit 104. With this display of message, the message can make the user to recognize that an unstable area is preset in the hard disk. When an operation is carried out to complete the display on the screen in step S224, the display of the message is completed on the screen of finder display unit 104 in step S217.

In the step S211, if an expression of "pre-correction error rate at record/reproduction completed">threshold value 4 is met, the difference is large as judged that "the diagnostic result is warning or (X)." The reproduction or record operating mode of the camera is stopped in step S218. The failure diagnosis/access display unit 114 turns on in step S219. The display of message for warning is displayed on the screen of finder display unit 104 in step 220, and also on the screen of liquid-crystal monitoring display unit 116 in step S221, therefore, this can make the user to recognize that a hazard area is present in the hard disk. When an operation is carried out to complete the display on screen in step S225, the display of message on the screens of the finder display unit 104 and liquid-crystal monitoring display unit 116 is completed in step S222.

Here, a reason why two types of displaying contents are provided for one message calling for caution and the other message for warning is that the messages make the user to recognize the degree of risk for the hard disk as early as possible. The contents of messages will be described later.

In addition to the embodiment, the turning-on state of the failure diagnosis/access display unit 114 after completing the record or reproduction operating mode is eventually turned off after a predetermined time duration, and the messages on the images of finder display unit 104 and liquid-crystal monitoring display unit 116 are also disappeared. These operations are carried out by the user, as described in the steps S224 and S225. However, the timing of turning off the display units is not limited to this embodiment. The display of display units may be continued until the power supply is shut off.

Here, a description will be concerned with a case of depressing the stop button in the step S206 and step S237. If the power supply is off-state in the steps S206 and S237, the displays of turning on and off the reproduction or record operating mode and the failure diagnosis/access display unit 114 are stopped in step S223, thereafter, the camera is made the power supply off mode. In the case of the steps S212, S214 and S218, the diagnostic result is saved to the CPU of system control unit 107, the displays of turning on and off the reproduction or record operating mode and the failure diagnosis/access display unit 114 are stopped, and the camera is then made the power supply off mode. Thereafter, the diagnostic result is displayed on the failure diagnosis/access display unit 114, finder display unit 104 and liquid-crystal monitoring display unit 116 when the power supply turns on.

In addition, the description of operation start timing has been made looking at the record and reproduction operating modes in the hard disk mounted camera in FIG. 2. However, the operation start timing may be set after the camera starts after the power supply of the camera turns on.

Further, the data of "initial pre-correction error rate" obtained from the camera uses of the number of Raw Read Errors in the invention. However, other information may also be used such as "the number of exchange sectors", "seek error", "starting time", "hard disk internal temperature", etc.

Figure 3:
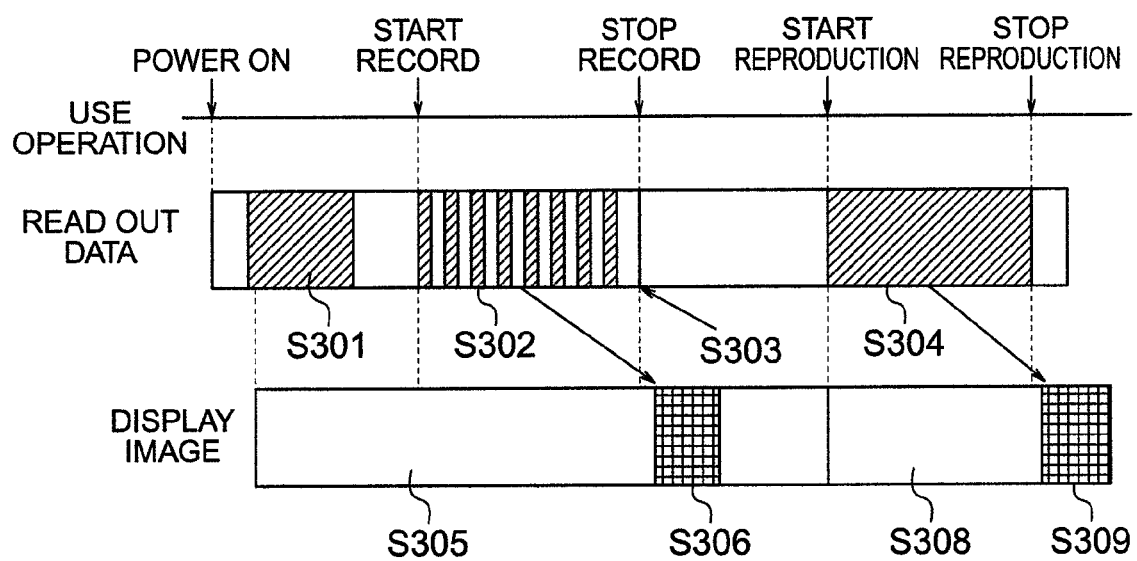
FIG. 3 is a timing chart showing an operation of a failure diagnosis and display of the camera.

Next, with use of FIG. 3, the following description will be concerned with, from an operational point of view of a camera as a whole, a collection timing of the Raw Read Error Rate number for carrying out the failure diagnosis and a message screen display timing. FIG. 3 shows timings of the failure diagnosis and the display in the camera of the invention. In FIG. 3, it assumes that the user, in turn, operates or swings the camera from the left to right direction in a predetermined time period. Of the timings, one timing indicates for read-out data from the hard disk medium 120 and the other timing indicates for the displays on the finder display unit 104 and liquid-crystal monitoring display unit 116. In addition, this description includes a case of carrying out the failure diagnosis of the hard disk after the power supply turns on.

An operational sequence is as follows. First, the user turns the power supply of camera on. A recording starts after starting the camera, and the recording stops after a certain recording is completed. Next, as an operation to confirm recorded video contents, a reproduction starts, and stops at a time of completing confirmation.

In FIG. 3, in the case of reading out data recorded on the hard disk medium 120, the reproducing data used for the failure diagnosis of hard disk is read out so that a data read-out operating step S301 is carried out after a starting operation necessary for approximately a few seconds from a time when the power supply of the camera turns on. As described in a part of FIG. 2, the time period of approximately 3 minutes is necessary for reading out the number of Raw Read Errors for the failure diagnosis. In the case where a camera angle is determined or the camera is left without operation over approximately 3 minutes after the power supply turns on, a reproducing data amount necessary for the failure diagnosis can be read out, and the data read-out operating step S301 is satisfied. In this case, the display of failure diagnostic result is not carried out. The failure diagnostic result is saved temporarily to a memory in the CPU, and displayed by timings of operating steps S306 and S309 as described later.

On the other hand, when the user makes the camera to be turned to the record operating mode, the data read-out operation for the failure diagnosis of hard disk is suspended and turned to the record operating mode. However, an ordinary hard disk has twice or more the write processing performance in comparison with an encoding rate of digital encoded video output from an encoding circuit of video camera. Therefore, a reproduced data amount necessary for the failure diagnosis is reproduced while the recoding data is accumulated in the buffer memory 121, even though a recording operation occurs during the data read-out operating step S301. Thereafter, the failure diagnosis is carried out, and the recording data is recorded on the hard disk medium 121 so that the data read-out operation for both the desired video and audio recording and the diagnosis can be carried out simultaneously without awaking the user.

Next, when the user depresses a recording button to start the recording, the camera carries out the recording of recording data and the reproducing of reproducing data alternately, by a time division with use of the buffer memory 121 as described above. Thereby, the reproduced data amount used for the failure diagnosis, which takes to the extent about 3 minutes, is obtained at a timing of a data fetched operating step S302 after starting the recording. It is decided that the diagnostic result of failure diagnosis is not displayed at a timing of an operating step S305 on the displayed images of the finder display unit 104 and liquid-crystal monitoring display unit 116, even though the obtaining of reproduced data amount necessary for the failure diagnosis is completed in the data read-out operating step S301 and data fetched operating step S302. Assuming that display such as a message is displayed on the displayed images of the finder display unit 104, liquid-crystal monitoring display unit 116, etc. at the timing of the operating step S305, not only a trouble occurs for a shooting operation but also the user mistrusts the camera. For this reason, it is not necessary to display quickly the contents of message since it is of a failure prediction, which is good for the user because of nothing display after the camera starts and immediately after the recording starts. In contrast to the timing of displaying the diagnostic result based on the number of Raw Read Errors of the reproduced data read out by the processes in the data read-out operating step S301 and data fetched operating step S302, the diagnostic result is displayed on the displayed screen of the finder display unit 104 and liquid-crystal monitoring display unit 116 at a timing of an operating step S306 after the user depresses the stop button for the recording, as the process in an operating step S303 shown in FIG. 3. Here, a display time period is as short as about 10 seconds. When the user depresses a button for canceling the operation, the screen is disappeared at that time. The screen can also be disappeared by depressing the cancel button without waiting for 10 seconds of the display. In addition, the reproducing data is read out until the record stop button is depressed, even though the reproduced data amount reaches to the foregoing prescript amount.

Next, a timing for reading out the reproducing data used for the most efficient failure diagnosis corresponds to a data read-out operating step S304 after the reproduction starts. Here, the number of Raw Read Errors is obtained for the failure diagnosis while the reproduction of video contents is maintained to carry out from the hard disk medium 120 in the camera. The reading out of the reproducing data used for the failure diagnosis is sufficiently carried out at a stage where the reproduction operating mode continues to the extent about 3 minutes. A calculation is therefore carried out to be able to obtain a failure diagnosis result. Consequently, a message is displayed at a timing of a screen display operating step S309 after the user operates the stop button for the reproduction. On the other hand, in a screen display operating step S308 after the reproduction starts, a video selected by the user is output, without change, to the finder display unit 104, liquid-crystal monitoring display unit 116, and the external output terminal. A reason why the message of diagnostic result is not displayed so as to be the image display operating step S308 at a time when the data read-out operating step S304 completes to obtain the data, is that a response to the operation or action on the camera by the user is displayed. At the same time, the message is not displayed in the middle of the reproduction, therefore, there is an advantage to prevent the reproduced screen from being difficult to be seen.

In this way, by displaying the response to the operation of user, this causes the diagnostic information to obtain from a result of operating positively by the user, without receiving the diagnostic information of the hard disk in a condition of user's victim mentality caused by unilaterally receiving the information from the camera. For this reason, a degree of reliability for the camera is not lost, as user's mentality.

Incidentally, when the reproducing data used for the failure diagnosis is read out by all of the timings such as the operating steps S301 and S302, the data read-out is carried out for the failure diagnosis at the power on. In the case of the record operating mode, a time period during which the hard disk operates becomes long since the read-out and recording of data are carried out alternately. This makes the life of hard disk drive short, and the power consumption of camera increased. Therefore, by using a clock function incorporated in the camera, either the operating step S301 or S302 may be carried out at a time point when the date changes if the timing of the operating step S301 or S302 is met first. Generally, in the case of hard disk-mounted camera, the degree of reliability has mostly and possibly reduced immediately after starting the camera, if the camera was left for an extended period of time (for example, one month) depending on an environment. This is a warning phenomenon indicating that the hard disk has a defect. This is because a head slider of the hard disk drive is adhered to a post of the head to thereby hardly start the disk due to the abandonment for a long period of time. If adhesive particles came off forcibly from the post around the slider and flied in all directions inside the hard disk, the surface of disk becomes finely tainted. Eventually, an undesirable phenomenon occurs possibly such as increase of the number of Raw Read Errors. Particularly, a sufficient diagnosis is necessary for a start from the condition where the hard disk does not use for long period of time. For this reason, in consideration of the business date, either all of the operating steps S301 and S302 or a part of the operating steps is mainly diagnosed for every month when the month changes. The operating step S304 may only be diagnosed after starting the reproduction if the diagnosis is carried out for every day when the date changes.

Figure 4:
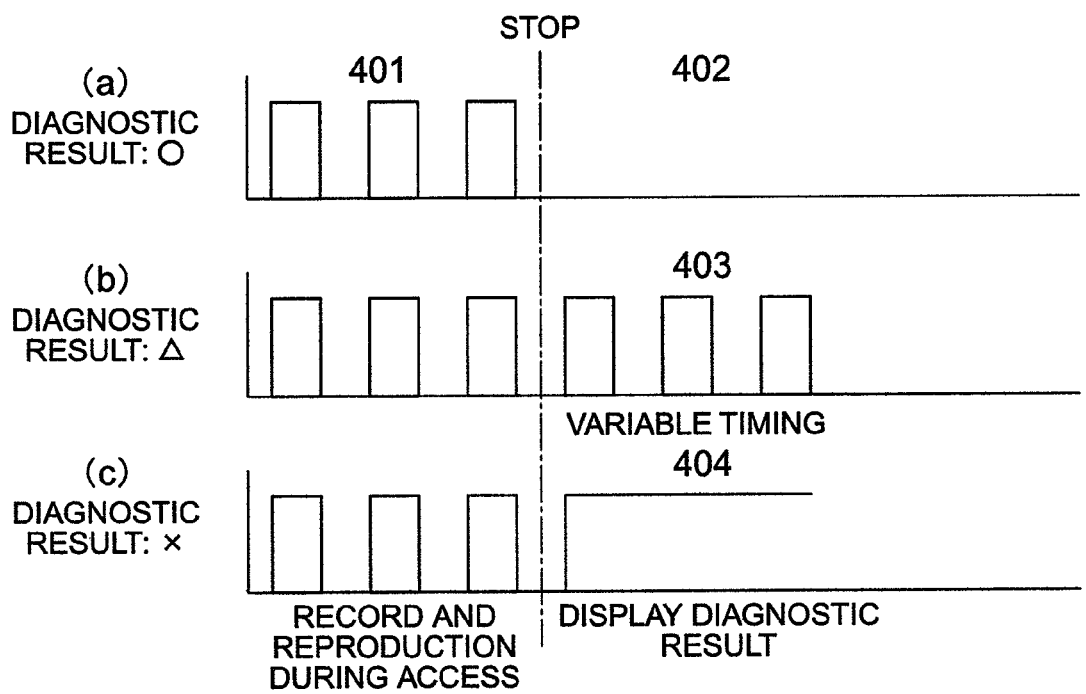
FIG. 4 is an operating timing chart showing an operation of a failure diagnosis/access display unit of the camera.

A display timing of the failure diagnostic result to be displayed on the failure diagnosis/access display unit 114 of the camera will be described with use of FIG. 4. FIG. 4(a) shows a display timing indicating that a diagnostic result is good or (◯). FIG. 4(b) shows a display timing indicating that the diagnostic result is middle or (Δ). FIG. 4(c) shows a display timing indicating that the diagnostic result is warning or (X).

In the record and reproduction operating modes of the camera, the failure diagnosis/access display unit 114 turns on and off in a time interval during which a turning-on period is equal to a turning-off period so as to be a predetermined interval, as a state 401 shown in FIG. 4(a). If the diagnostic result is judged to "good or (◯)" in the step S211 in FIG. 2, the failure diagnosis/access display unit 114 turns off after the record and reproduction operating mode are stopped as a state 402 shown in FIG. 4(a). If the diagnostic result is judged to "middle or (Δ)" in the same, the display unit 114 turns on and off by a predetermined time interval after the record and reproduction operating modes are stopped as a state 403 shown in FIG. 4(b). Further, if the diagnostic result is judged to "warning or (X)", the display unit 114 becomes turned on after the record and reproduction operating modes are stopped as a state 404 shown in FIG. 4(c).

In addition, the three types of diagnostic results have been described with use of the two types of threshold values in this embodiment. However, for a purpose of obtaining a number of diagnostic results, the timings for the turning on and off periods of the failure diagnosis/access display unit 114 may also be changed in response to the diagnostic result.

Further, the failure diagnosis/access display unit 114 is realized with a single color LED in the foregoing embodiment, but two-color LED may be used with one for green to display the access and the other for orange to display the failure diagnosis discriminatively.

Figures 5A, 5B, 6:
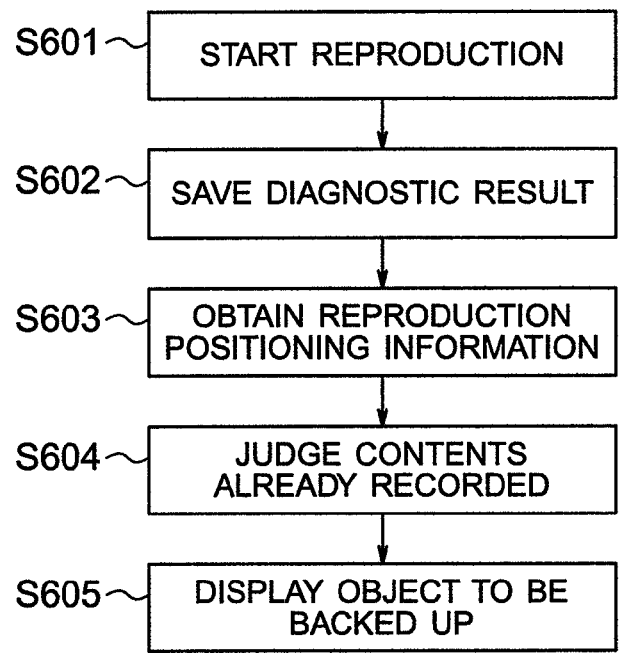
FIGS. 5A and 5B are message display examples on the camera.
FIG. 6 is a flow chart showing an operation of displaying a diagnostic result of contents in the camera.

Display examples of the message will be described with use of FIG. 5A and FIG. 5B to be displayed on the finder display unit 104 and liquid-crystal monitoring display unit 116 in the steps S216, S219 and S220 shown in FIG. 2. FIGS. 5A and 5B are display examples of the diagnostic result of the camera in the invention, in which FIG. 5A shows a message display example for the finder display unit 104 when the diagnostic result is judged to "middle or (Δ)", and FIG. 5B shows a message display example for the finder display unit 104 and liquid-crystal monitoring display unit 116 when the diagnostic result is judged to "warning or (X)."

In the case where the diagnostic result is "middle or (Δ)", the necessity for action by the user is not hasty. Therefore, a message "Error is detected for the data output from the hard disk. Please be advised to inspect by service." is displayed on the finder display unit 106 to call for caution as shown in FIG. 5A. Consequently, if the user saw the display, the message makes the user to recognize a failure which comes shortly after, without causing a panic.

In the case where the diagnostic result is "warning or (X)", a message "Error is detected for the data output from the hard disk. Backup for the data is immediately necessary." is displayed on the finder display unit 104 and liquid-crystal monitoring display unit 116 to warn the risk of failure as shown in FIG. 5B. In this case, the contents of message are hustled, therefore, the message makes the user to recognize the risk of failure and urges the user to take a backup for the recorded data. Further, in the case of the message shown in FIG. 5A corresponding to the previously described diagnostic result judged to "middle or (Δ)", the user accepts easily since the message is not an unexpected display.

Here, a reason why the display unit to display the messages is changed in response to the diagnostic result is that the message makes the user to sense easily the diagnostic result when the message calls for caution, but the user has to sense the diagnostic result when the message is of the warning, therefore, the message is displayed not only on the finder display unit 104 but also on the liquid-crystal display unit 116.

Further, the pre-correction error rate changes in accordance with a position on hard disk medium 120 since it depends on the physical characteristic of hard disk medium 120 generally. It can be said that the position where the pre-correction error rate is relatively bad is a position where the read-out reliability of hard disk is reduced, that is, the position has a high risk diagnostic result judged to "warning or (X)." In the case of seeing the camera from the user, the contents recorded on a position having a high pre-correction error rate should be protected most urgently. Even in the case of the camera side, the contents recorded on the position having the high pre-correction error rate are transferred to the user by the fastest method without contributing the sense of mistrust to the camera. In this regard, a processing flow and a message display example will be described with use of FIG. 6 and FIG. 13 for displaying the diagnostic result of contents in the camera of the invention. FIG. 6 is a flow chart to display the diagnostic result of contents in the camera. FIG. 13 shows a display example for protecting the contents of the camera in the invention.

First, in step S601, the reproduction operation starts to reproduce the contents in the hard disk medium 120 by the indication of user, that is, reproducing data is reproduced for the diagnosis which takes to the extent approximately 3 minutes. Thereafter, the "pre-correction error rate at record/reproduction completed" obtained from the number of reproduced data (Raw Read Error) of the hard disk medium 120 is compared with the "initial pre-correction error rate" to obtain a diagnostic result, as described in FIG. 2. This operation corresponds to the steps S201 to S211 in FIG. 2. The diagnostic result is saved temporarily to a memory of system control unit 107 in step S602. Logical reproduction positioning address information of the hard disk is then obtained in step S603, and saved to the memory of system control unit 107 together with the diagnostic result which is temporarily saved in the step S602. Here, the diagnostic result and the reproduction positioning address information are saved for every reproduction of the contents. In step S604, the process judges which contents have the most descent for the degree of read-out reliability, or the diagnostic result is bad, from the diagnostic result saved to the memory of system control unit 107 and the reproduction positioning address information of the contents. Next, in step S605, for a purpose of protecting the contents specified that the diagnostic result is bad in the step S604, a message "the contents recorded in a third position from the head on March 3rd. are necessary to take a backup" as shown in FIG. 13 is displayed on the finder display unit 104 and liquid-crystal monitoring display unit 116, so that risk avoidance information of the contents in the hard disk can be provided for the user.

In addition, when the position of contents to be backed up is specified, the contents may be copied to a relatively safe position for the diagnostic result from a risky position of the bad diagnostic result on the hard disk, which is automatically operated by the camera, in the case where the camera incorporates both the hard disk and a non-contact type optical disk, for example. Further, the contents shown in FIG. 13 are displayed when a recordable optical medium is used alone, so that useless displays can be eliminated, and information can be provided to be acceptable for the user.

Figure 11A:
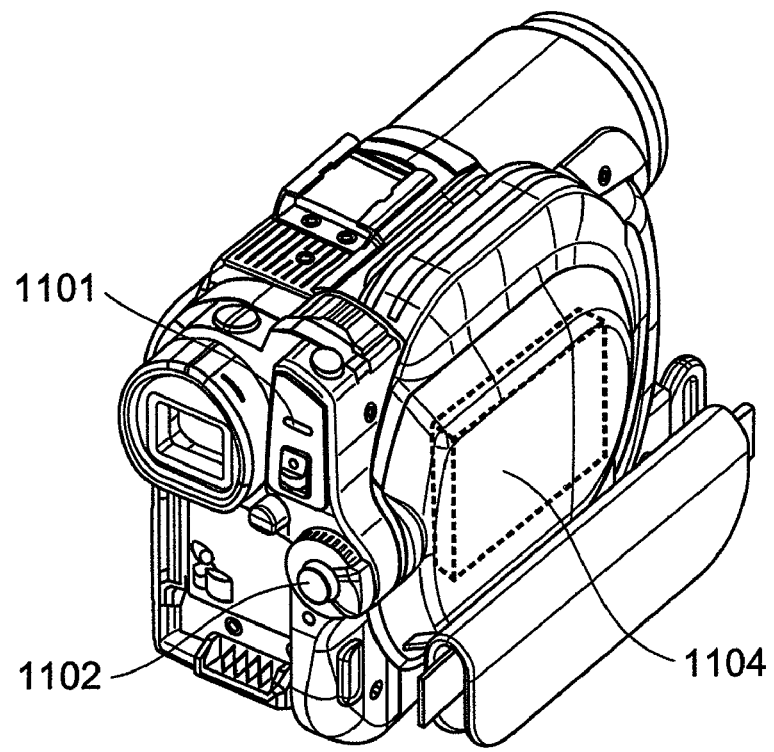
FIGS. 11A and 11B are outline views of the camera in the invention.
Figure 11B:
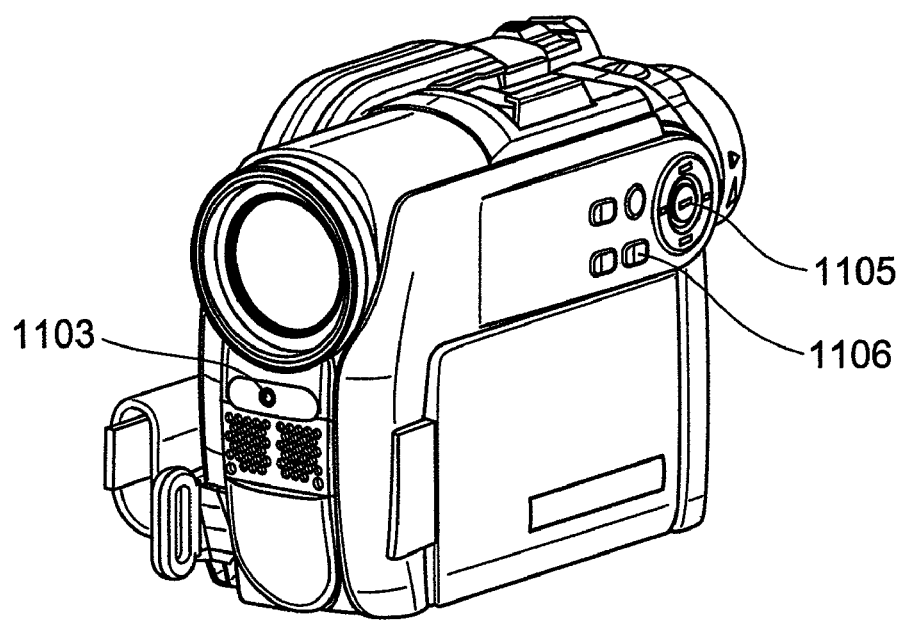

FIG. 11A and FIG. 11B are outline views of the hard disk-mounted camera in the invention. A reference numeral 1101 denotes an LED of the failure diagnosis/access display unit 114. By depressing a record/stop button 1102, the record operating mode is set, and a record-on lamp 1103 is turned on red indicating that the hard disk is recording. The LED 1101 of failure diagnosis/access display unit 114 is also turned on and off by a predetermined time interval. A reference numeral 1104 denotes a hard disk drive. Depressing a reproduction button 1105 makes the hard disk drive to be set to the reproduction operating mode. The LED 1101 of failure diagnosis/access display unit 114 is then turned on by the predetermined time interval. Thereafter, depressing a reproduction stop button 1106 makes the reproduction operating mode to stop. The LED 1101 of the unit 114 is turned off, turned on and off, or turned on in response to the diagnostic result.

Here, the color of LED may be changed to other colors to have variation in response to the warning displays dependent on the access displays and diagnostic result.

Embodiment 2

Figure 7:
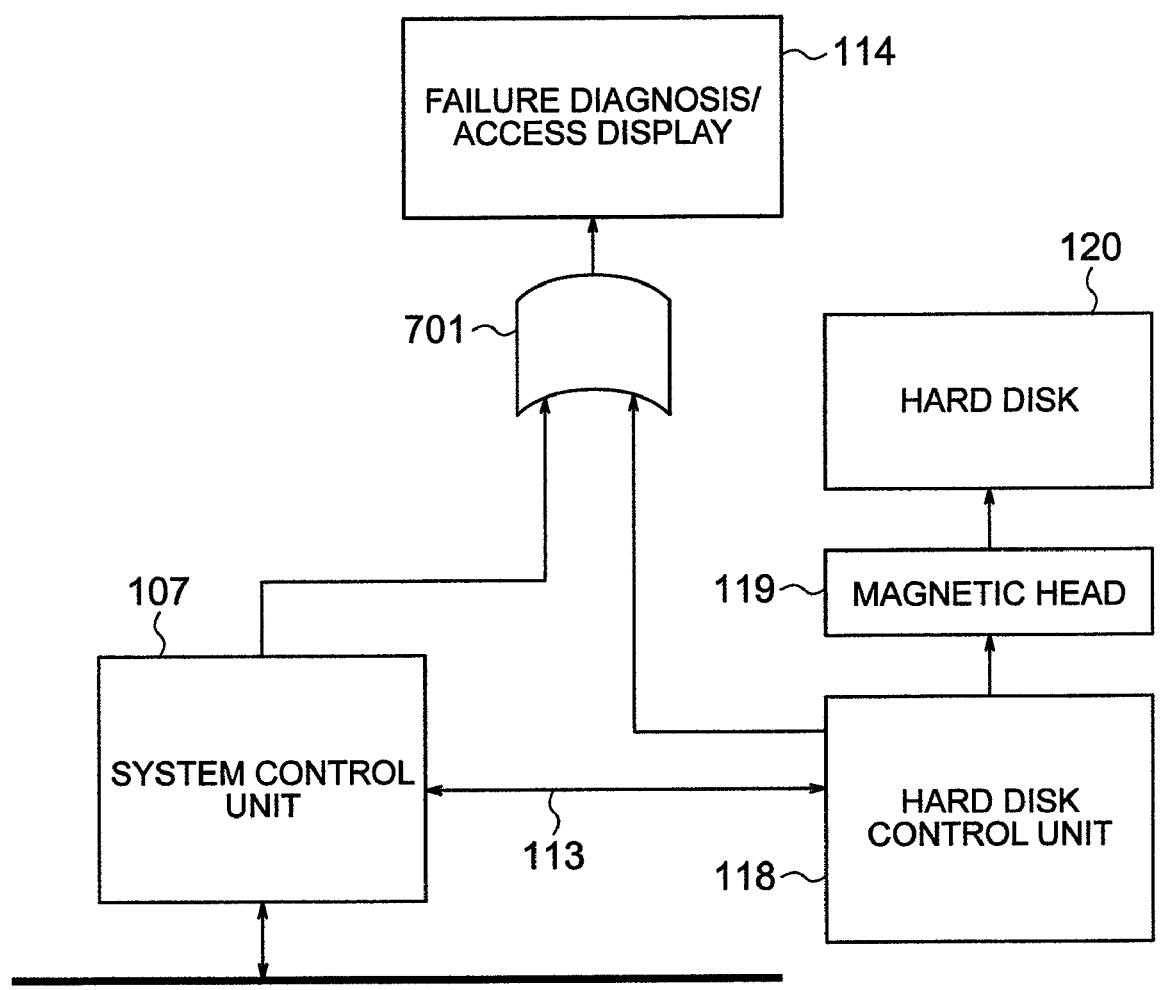
FIG. 7 is a circuit block diagram showing a drive unit of the failure/access display unit in the second embodiment.

A constitution and operation of a drive unit for the failure diagnosis/access display unit 114 of the camera will be described with use of FIG. 7 in a second embodiment of the invention. FIG. 7 is a circuit block diagram of the drive unit in the unit 114 in which a logical sum element 701 is added to the diagram in FIG. 1 of the first embodiment.

The logical sum element 701 takes a logical sum of the diagnostic result display output from the system control unit 107 and the access display of the case where the hard disk control unit 118 operates. The hard disk control unit 118 outputs an access display signal of display information to the logical sum element 701 which is on access. The system control unit 107 outputs display information of the failure diagnostic result to the logical sum element 701. On the record or reproduction mode, the failure diagnosis/access display unit 114 is turned on and off in the predetermined time interval in response to the display information from the hard disk control unit 118. After the record and reproduction modes are stopped, the unit 114 is tuned off, turned on and off, or turned on in response to the diagnostic result in response to the display information of system control unit 107.

Embodiment 3

Description will be concerned with use of FIGS. 8 to 10A and 10B to display the diagnostic result of failure diagnosis for every content, as a second aspect of the invention.

Figure 8:
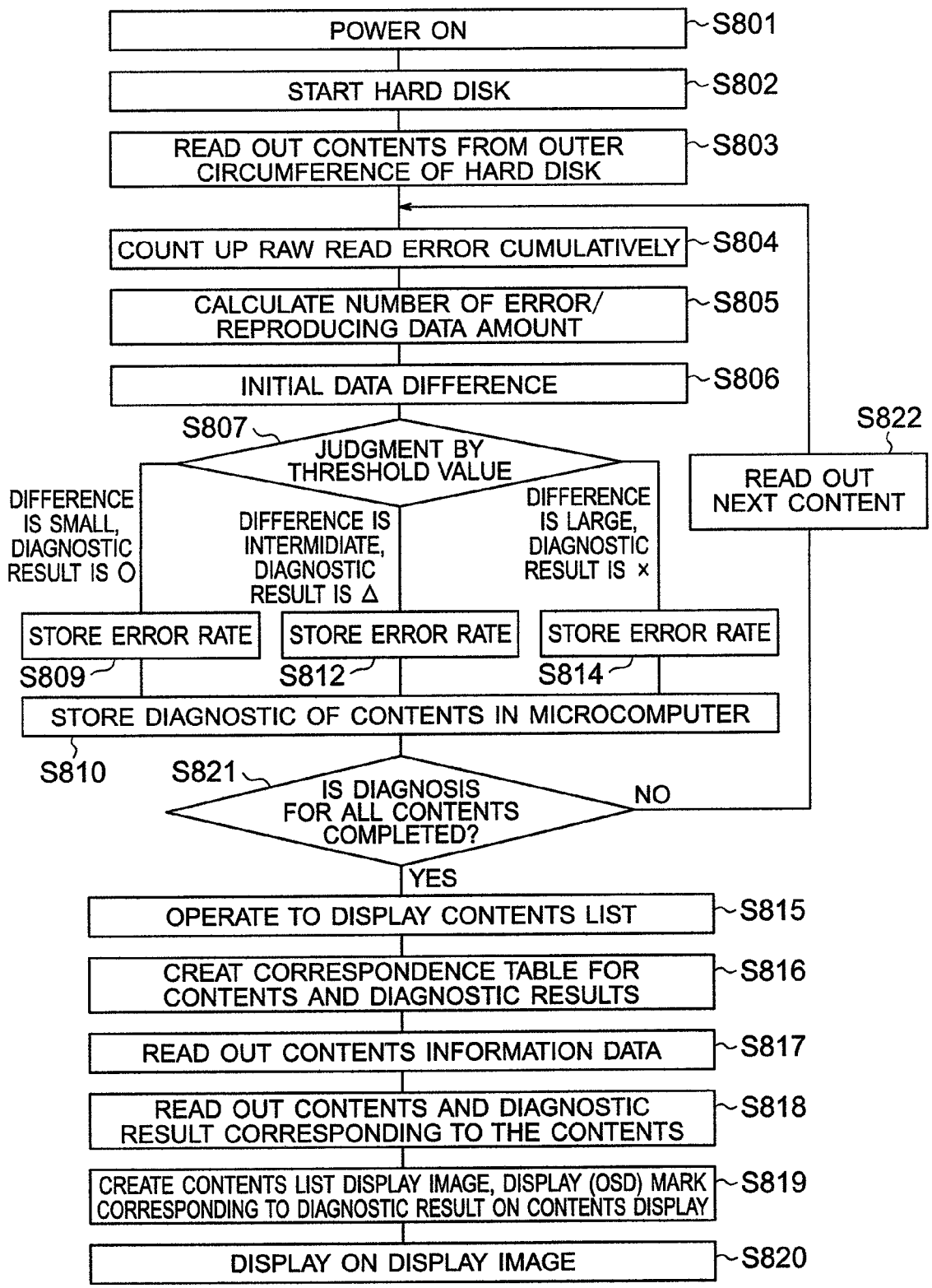
FIG. 8 is a flow chart showing an operation of displaying the diagnostic result of the camera for every content in the third embodiment of the invention.
Figure 9:
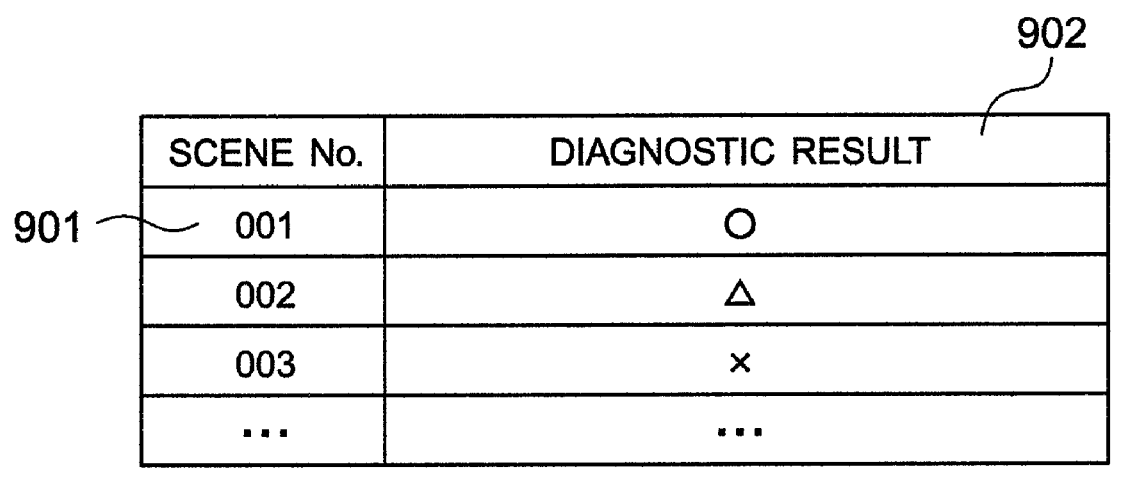

FIG. 8 is a flow chart showing a process to display the diagnostic result of the camera for every content in a third embodiment of the invention. FIG. 9 is a correspondence table showing content numbers and diagnostic results of the camera in the third embodiment of the invention.

First, in step S801, when the power supply of the camera turns on, the hard disk starts in step S802. First contents data on the outer circumference side of the hard disk is read out as reproduced data in step S803. This reproduction operation continues by a predetermined time period (for example, three minutes). In step S804, the number of Raw Read Errors is cumulatively counted up. Here, the number of Raw Read Errors to be counted up is normally $10^{-8}$ to $10^{-9}$ as an error rate when the state of camera is normal, therefore, the reproduced data over 1 Gbit ($10^9$ bits) is required as a read-out result. For this reason, in the process of the step S804, a time period of approximately 3 minutes is necessary for the reproducing operation in the case of the reproduction operating mode for the video and audio data which is read out at a speed of approximately 6 Mbps. The cumulative total number of Raw Read Errors in the step S804 is calculated by the following expression in step S805, and a pre-correction error rate is calculated by the CPU in the system control unit 107 to save to a memory (not shown in the drawing) around the system control unit 107.

pre-correction error rate=number of pre-correction errors [bit]/data amount of entire reproduction [bit]

Next, in step S806, a difference is obtained between an "initial pre-correction error rate" previously obtained and saved at a time point of shipping the camera, and the "error rate at reproduction completed" calculated in the step S805. In step S807, a threshold value has two stages such as threshold value 3<threshold value 4. That is, in the case of "error rate at reproduction completed"<threshold value 3, the difference is small as judged that "the diagnostic result is good or (○)." In step S809, the pre-correction error rate of the contents is stored in the memory (not shown) of the system control unit 107, and the diagnostic result of contents is also stored in the memory (not shown) of the unit 107 in step S810.

In the case of threshold value 3<"pre-correction error rate at reproduction completed"<threshold value 4, in the step S807, the difference is intermediate as judged that "the diagnostic result is middle or (Δ)." In step S812, the pre-correction error rate of contents is stored in the memory (not shown) of the unit 107, and the diagnostic result of contents is also stored in the memory (not shown) of the unit 107 in the step S810.

In the step S807, in the case of "pre-correction error rate at reproduction completed">threshold value 2, the difference is large as judged that "the diagnostic result is warning or (X)." In step S814, the pre-correction error rate of contents is stored in the memory (not shown) of system control unit 107. In the step S810, the diagnostic result of contents is stored in the memory (not shown) of the unit 107.

Here, the information stored in the memory (not shown) in the step S810 is stored so that the number and diagnostic result of the contents (scene) are corresponded to each other as shown in FIG. 9.

The process described above is carried out for one contents and for all of the contents repeatedly. When the diagnosis of the first contents is completed in step S821, next contents are read out in step S822. The process returns to the step S804 to cumulatively count up the number of Raw Read Errors from reproduced data of the second contents. When the process for all of the contents is completed in the step S821, the camera is set to a waiting state for operation of the user.

Thereafter, when an operation for displaying a contents list is carried out by the user in step S815, in step S816, the correspondence table of the contents number and diagnostic result shown in FIG. 9 is created on the basis of the diagnostic result for every contents (scene) stored in the memory of system control unit 107 in the step S810. Referring to FIG. 9, a reference numeral 901 denotes contents (scene), and 902 denotes a diagnostic result of the contents. In the case of this embodiment, marks corresponding to the diagnostic results are formed in advance. Next, data of the contents information is read out from the memory of system control unit 107 in step S817. In step S818, contents and diagnostic result corresponding to the contents are read out from the memory of system control unit 107. In step S819, a contents list display image is created, and a process is carried out so that the mark of diagnostic result is overlapped with every content on the contents list display in step S819. In step S820, the contents list is displayed on the finder display unit 104 and liquid-crystal monitoring display unit 116.

Figures 10A, 10B:
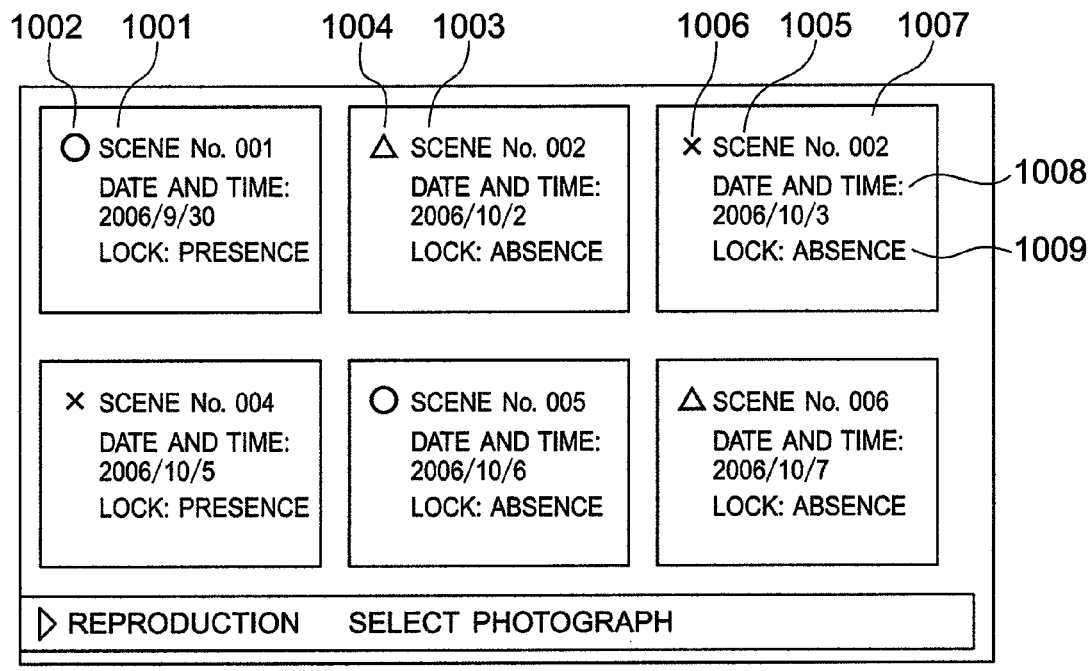
FIGS. 10A and 10B are examples of contents list display images of the camera in the third embodiment of the invention.

A display example of the contents list image to be displayed in the step S819 will be described with use of FIG. 10A and FIG. 10B in the third embodiment of the invention. FIG. 10A shows an example of a thumbnail list display image of the contents. FIG. 10B shows an example of a list display image.

In the case of the thumbnail display image of contents, the marks "○", "Δ" and "X" as diagnostic results are indicated on each of the thumbnail pictures as typified the contents shown in FIG. 10A. That is, the mark "○" 1002 is overlapped with and indicated on a thumbnail picture 1001 since a scene No. 001 has a diagnostic result indicating "good." Similarly, the mark "Δ" 1004 is overlapped with and indicated on a thumbnail picture 1003 since a scene No. 002 has a diagnostic result indicating "middle." The mark "X" 1006 is overlapped with and indicated on a thumbnail picture 1005 since a scene No. 004 has a diagnostic result indicating "warning." In addition, a reference number 1007 denotes a scene No, 1008 denotes a shooting date and time, and 1009 denotes a lock state indicating lock or unlock to be prevented from deleting the contents.

Further, in the case of the list display image of contents in FIG. 10B, the marks "○", "Δ" and "X" as the diagnostic result are indicated on each of the lines of contents number. That is, the mark "○" 1012 is indicated on a line 1011 of scene No. 001. Similarly, the mark "Δ" 1014 is indicated on a line 1013 of scene No. 002. The mark "X" 1016 is also indicated on a line 1015 of scene No. 004. The user therefore sees the foregoing images to recognize the degree of risk caused by a failure for each of the contents, so that the user is urged to take a backup for the contents having a high degree of risk.

Here, the pre-correction error rate stored in the memory in the steps S809, S812 and S814 may be displayed together with the diagnostic results shown in FIGS. 10A and 10B.

In the case of the third embodiment, the contents recorded on the hard disk are read out automatically when the power supply turns on. The failure diagnosis is carried out for each of the contents to then accumulate the diagnostic result. Thereafter, when the operation is carried out to display the contents list display, the diagnostic result is displayed together with the thumbnail display image and list display image shown in FIGS. 10A and 10B. However, the foregoing operation to turn the power supply on is not limited to the operation by the user. For example, the power supply is automatically turned on at night or in a period of time during which the camera is not used, the failure diagnosis is then carried out, and the diagnostic result may be stored in the memory. Particularly, in the case where a device always connected and received the power supply from a receptacle is such as a recorder, it is effective to use the method of diagnosing the contents in the period of time when the user does not use the device. In this way, the diagnostic result can be always confirmed when the operation is carried out for displaying the contents list.

Further, the diagnostic result is not deleted if the result is stored in a non-volatile memory in advance. This is useful for a device which is easily disconnected from the power supply such as a camera etc.

The diagnostic result of contents is identified at a time point when the recording is completed if it is stored in the memory at a time of recording the contents, so that the diagnostic result can always be confirmed in the contents list display. Further, in the reproduction for contents, the latest diagnostic result can be confirmed if the information in the memory is updated by the diagnostic result which is diagnosed while the reproduction is carried out. Here, it is also possible to save the diagnostic result to a management file together with the contents on hard disk. In this case of the foregoing method, a specifically assigned memory area is not necessary.

In the embodiment described above, in the record and reproduction operating modes, the access display is turned on and off by the predetermined time interval, thereafter, turned off, turned on and off, and turned on in response to the diagnostic result, when the record and reproduction operating modes are completed. However, the access display in the record and reproduction operating modes may be changed in response to the diagnostic result if a failure diagnosis display lamp for the hard disk can also be served as the failure diagnosis/access display unit 114. For example, in the case where the diagnostic result is "good", the access display is made turned on and off by a few second time interval. If the access display becomes turned on and off to the extent of once a minute as the diagnostic result goes bad, the user can easily that "abnormality occurs" on the normally seen failure diagnosis/access display unit 114.

In the embodiment described above, an operating state display unit for displaying the diagnostic result of failure diagnosis is served as the LED of access display unit on the camera. The operating state display unit is not limited to the foregoing use. A display tube may also be used for displaying a hard disk mode.

In the embodiment described above, the device is used for recording and reproducing the video and audio data, however, text and drawing data may also be used for the record and reproduction.

In the embodiment, the invention has been described with the hard disk-mounted camera. An object product is not limited to the camera, but any products may be acceptable if the product has a hard disk drive, for example, a hard disk-mounted recorder, hard disk-mounted television set, and hard disk drive device.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording and reproducing apparatus, comprising:
a recording medium to record and reproduce data,
an operating state display unit which displays an operating state of the recording medium,
a failure diagnosis unit which carries out a failure diagnosis by using error information of the data reproduced from the recording medium,
an output unit which outputs the data reproduced from the recording medium on a display unit, wherein the display unit is discrete from the operating state display unit, and
at least one control unit to effect both of a function (a) and a function (b) wherein, after a predetermined operating mode of the apparatus is completed, one of the functions (a) and (b) selectively operates depending on a diagnostic result by the failure diagnosis unit, such that, in the function (a) the diagnostic result is displayed only on the operating state display unit amongst the operating state display unit and the display unit, and in the function (b), the diagnostic result is displayed on both of the operating state display unit and the display unit.

2. The apparatus according to claim 1, wherein the predetermined operating mode includes a record operating mode or reproduction operating mode of the apparatus, and the failure diagnosis in the failure diagnosis unit is carried out during the predetermined operating mode.

3. The apparatus according to claim 1, wherein a turning-on and/or turning-off duration of the operating state display unit is changed in response to the diagnostic result obtained from the failure diagnosis unit.

4. The apparatus according to claim 1, wherein as the diagnostic result obtained from the failure diagnosis unit is deteriorated, a turning-on duration of the operating state display unit is set long and a turning-off duration thereof is set short.

5. The apparatus according to claim 1, wherein the recording medium includes a hard disk and the operating state display unit is an access display unit used for displaying that the hard disk is in a state of accessing.

6. A recording and reproducing apparatus according to claim 1, further comprising a video screen generation unit to generate video screen information that displays a list image of contents recorded on the recording medium, wherein a diagnostic result obtained from the failure diagnosis unit is displayed for every content on a contents list image generated by the video screen generation unit.

7. A recording and reproducing apparatus, comprising:
a recording and reproducing unit that records or reproduces data on or from a recording medium;
an access display unit that displays that the recording medium is in an access state;
a failure diagnosis unit that carries out a failure diagnosis by using error information of the data reproduced from the recording medium while the recording and reproducing unit records or reproduces the data on or from the recording medium,
an output unit which outputs the data reproduced from the recording medium in such a way in which the data is displayed on a display unit, wherein the display unit is discrete from the access display unit, and
at least one control unit to effect both of a function (a) and a function (b) wherein, when the record or reproduction is completed, one of the functions (a) and (b) selectively operates depending on a diagnostic result obtained from the failure diagnosis unit, where in the function (a), the diagnostic result obtained from the failure diagnosis unit is displayed only by changing a turning-on and/or turning-off duration of the access display unit amongst the access display unit and the display unit, and in the function (b), the diagnostic result obtained from the failure diagnosis unit is displayed by changing a turning-on and/or turning-off duration of the access display unit and also displaying the diagnostic result on the display unit.

8. A recording and reproducing apparatus, comprising:
a recording medium to record and reproduce data,
an operating state display unit which displays an operating state of the recording medium,
a failure diagnosis unit which carries out a failure diagnosis by using error information of the data reproduced from the recording medium,
an output unit which outputs the data reproduced from the recording medium on a display unit, wherein the display unit is discrete from the operating state display unit, and
at least one control unit to effect both of a function (a) and a function (b) wherein, after a predetermined operating mode of the apparatus is completed, one of the functions (a) and (b) selectively operates depending on a diagnostic result by the failure diagnosis unit, such that, in the function (a) effected upon the diagnostic result indicating normalcy, the diagnostic result is displayed only on the operating state display unit amongst the operating state display unit and the display unit, and in the function (b) effected upon the diagnostic result indicating abnormalcy, the diagnostic result is displayed on both of the operating state display unit and the display unit.

* * * * *